United States Patent [19]
Devenyi et al.

[11] Patent Number: 5,686,723
[45] Date of Patent: Nov. 11, 1997

[54] LIGHT SENSING DETECTOR ASSEMBLY WITH INTEGRAL FIBER OPTIC LIGHT TRANSMISSION ELEMENTS

[75] Inventors: Gabor Devenyi, Penetang; Joerg Hollmann, Midland, both of Canada

[73] Assignee: Hughes Electronics, Los Angeles, Calif.

[21] Appl. No.: 629,820

[22] Filed: Apr. 10, 1996

[51] Int. Cl.$^6$ .................................................. H01J 5/16
[52] U.S. Cl. ................... 250/227.11; 250/227.28; 385/116
[58] Field of Search .................... 250/227.11, 227.28, 250/227.29; 385/116, 115, 147, 133, 33, 89, 92, 12

[56] References Cited

U.S. PATENT DOCUMENTS 3,483,389  12/1969  Cronin ............................. 250/227.28
3,542,451  11/1970  Washburn ......................... 250/227.28

*Primary Examiner*—Que Le
*Attorney, Agent, or Firm*—Gordon R. Lindeen, III; Michael W. Sales; Wanda K. Denson-Low

[57] ABSTRACT

In accordance with the teachings of the present invention, a light sensing detector assembly (10) having integral fiber optic light transmission strands (16) is provided. The light sensing detector assembly (10) includes a quadrant detector (12) having a plurality of apertures (14) extending therethrough and a photosensitive surface (20) that generates photocurrents in response to exposure to light. The plurality of fiber optic strands (16) each have a first end (18) and a second end (22). The first ends (18) extend through the plurality of apertures (14) and outwardly from the photosensitive surface (20). A light source (26) projects light onto the second ends (22) of the plurality of fiber optic strands (16) such that the light is transmitted through the plurality of fiber optic strands (16) towards a reflective workpiece (50). The light reflected from the workpiece (50) in turn impinges upon the photosensitive surface (20).

20 Claims, 2 Drawing Sheets

LIGHT SENSING DETECTOR ASSEMBLY WITH INTEGRAL FIBER OPTIC LIGHT TRANSMISSION ELEMENTS

BACKGROUND OF THE INVENTION

1. Technical Field

This invention relates to a light sensing detector assembly and, more particularly, to a light sensing detector assembly having integral fiber optic light transmission elements that provide improved light transmission efficiency.

2. Discussion of Related Art

Light sensing detectors are generally known in the art. Such light sensing detectors include, but are not limited to, full quadrant and split detectors that produce measurable photocurrents in response to exposure to light. As discussed in commonly assigned U.S. Pat. No. 5,396,060 to Devenyi et al, which is hereby incorporated by reference, quadrant detector arrangements are commonly used to optically align a workpiece to a preselected position or to measure the optical properties of spherical lenses. In these, as well as other applications, quadrant detector arrangements project light onto a given reflective workpiece and measure variations in the amount of light reflected therefrom in order to accomplish a given goal. The light transmission efficiency of light sensing detector arrangements is of the utmost importance because it is a major factor that limits a detector arrangement's minimum light source power requirements.

Unfortunately, past quadrant detector arrangements frequently employed beamsplitting optics as well as various optical lenses that reduced the light transmission efficiency of such arrangements. A significant drawback associated with the use of beamsplitters is that only approximately one half of the original light signal from a detector arrangement's light source is ultimately projected toward a given workpiece. Hence, such arrangements generally required powerful light sources and/or relatively sensitive quadrant detector devices.

In order to increase light transmission efficiency, the quadrant detector arrangement disclosed in U.S. Pat. No. 5,396,060 to Devenyi et al includes a quadrant detector having a plurality of integral light channels formed therein through which collimated light is projected onto a workpiece. The inclusion of such integral light channels improves the light transmission efficiency of the arrangement and reduces the required wattage of its light source when compared to past arrangements employing beamsplitting optics in conjunction with complex arrangements of optical lenses.

However, it is desirable to provide a light sensing detector assembly that has further increased light transmission efficiency and allows for the use of a light source with further reduced power requirements.

SUMMARY OF THE INVENTION

In accordance with the teachings of the present invention, a light sensing detector assembly including a light sensing detector with integral fiber optic light transmission elements that improve light transmission efficiency and reduce light source power requirements is provided.

The light sensing detector assembly includes a light sensing detector having a plurality of apertures extending therethrough. The light sensing detector includes a photosensitive surface and a plurality of fiber optic strands each having a first end and a second end. Each of the plurality of fiber optic strands extends through one of the plurality of apertures with the first ends terminating in close proximity to the photosensitive surface. A collimating optical element is disposed between a light source and the second ends of the plurality of fiber optic strands such that light from the light source is transmitted through the plurality of fiber optic strands toward a workpiece. Light reflected from the workpiece impinges upon the photosensitive surface so as to generate a photocurrent in accordance with the amount of light impinging upon the photosensitive surface.

According to a preferred embodiment, the light sensing detector includes a layer of transparent optical epoxy disposed on the photosensitive surface and which encases the first ends of the plurality of fiber optic strands.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENTS

The following description of the preferred embodiments is merely exemplary in nature and is in no way intended to limit the invention or its application or its uses.

Figures 1, 3:
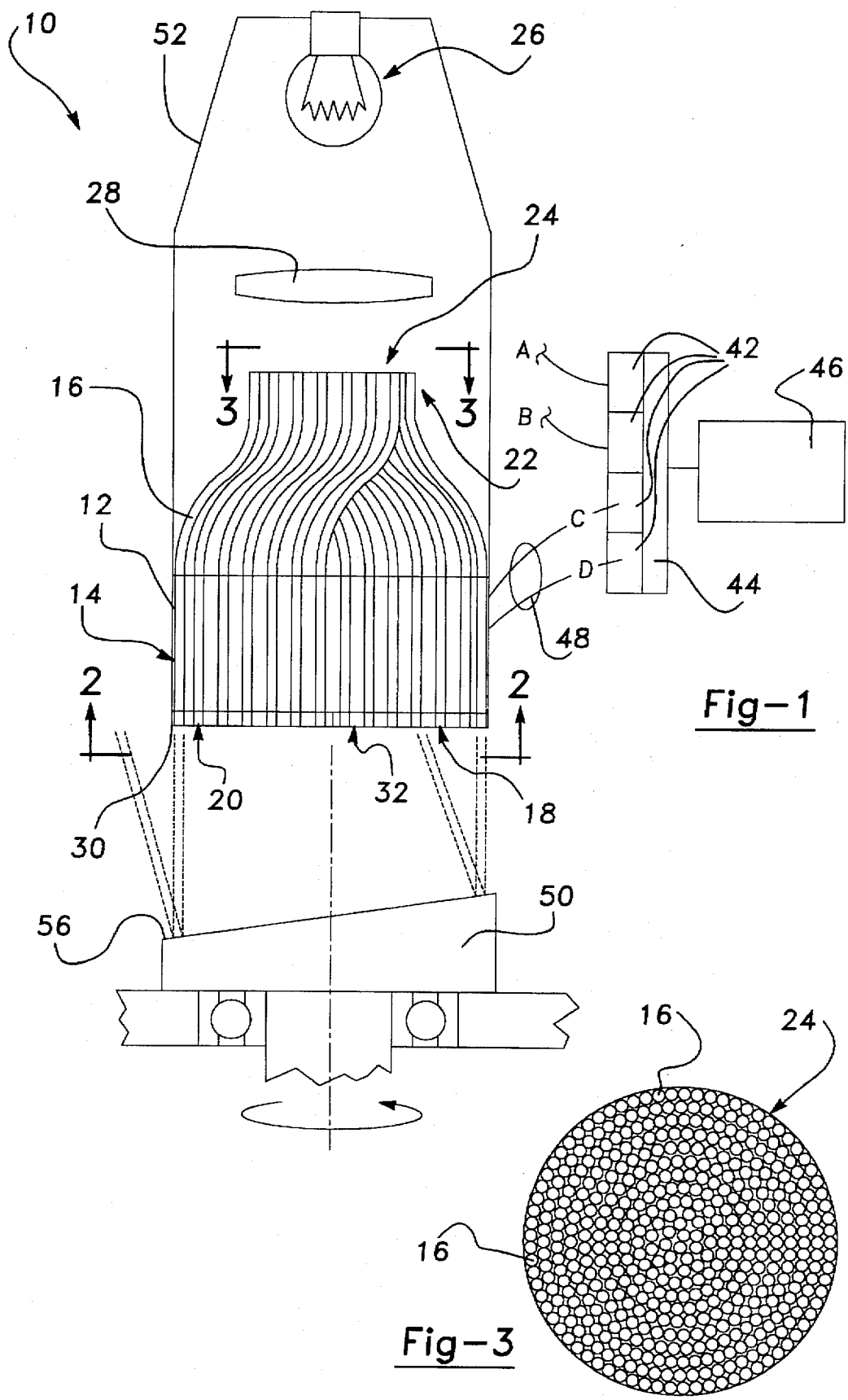
FIG. 1 is an optical diagram illustrating a light sensing detector assembly having a quadrant detector with integral fiber optic light transmission strands extending therethrough in accordance with the present invention.
FIG. 3 is a view, along line 3—3 of FIG. 1, of the light receiving surface formed by the plurality of fiber optic light transmission strands in accordance with the present invention.

A light sensing detector assembly 10 is illustrated in FIG. 1. The light sensing detector assembly 10 includes a light sensing detector such as a quadrant detector 12 having a plurality of apertures 14 extending therethrough. A corresponding number of integral fiber optic strands 16 have first ends 18 extending through the apertures 14. Each of the first ends 18 extend outwardly a short distance past a photosensitive surface 21 of the quadrant detector 12. The fiber optic strands 16 have opposite second ends 22 that are randomly mixed and bonded to one another by a suitable bonding agent such as an optical epoxy or the like. With reference to FIG. 3, the second ends 22 of the fiber optic strands 16 are polished so as to form a uniform light receiving surface 24.

The light sensing detector assembly 10 further includes a light source 26 and a collimating optical element 28. The light source 26 can be halogen lamp, a LED lamp, or any other suitable light source. The collimating optical element 28 is disposed between the light source 26 and the light receiving surface 24. The light source 26 and the collimating optical element 28 serve as a means for projecting light onto the light receiving surface 24 such that the light is efficiently transmitted through the plurality of fiber optic strands 16 toward a rotatable reflective workpiece 50. Typically, the photosensitive surface 20 is made from a material such as silicone that generates a photocurrent in accordance with the amount of light impinging upon the photosensitive surface 20.

In the preferred embodiment, the quadrant detector 12 includes a layer of transparent optical epoxy 30 disposed on the photosensitive surface 20 and encasing the first ends 18 of the fiber optic strands 16. The layer of transparent optical epoxy 30 is polished such that each of the first ends 18 of the fiber optic strand 16 are substantially coplaner with an outer surface 32 of the layer of epoxy 30. It will be understood by one skilled in the art that the first ends 18 of the fiber optic stands 16 may alternatively be coplanar with the photosensitive surface 20, with the transparent optical epoxy 31 disposed thereon.

Figure 2:
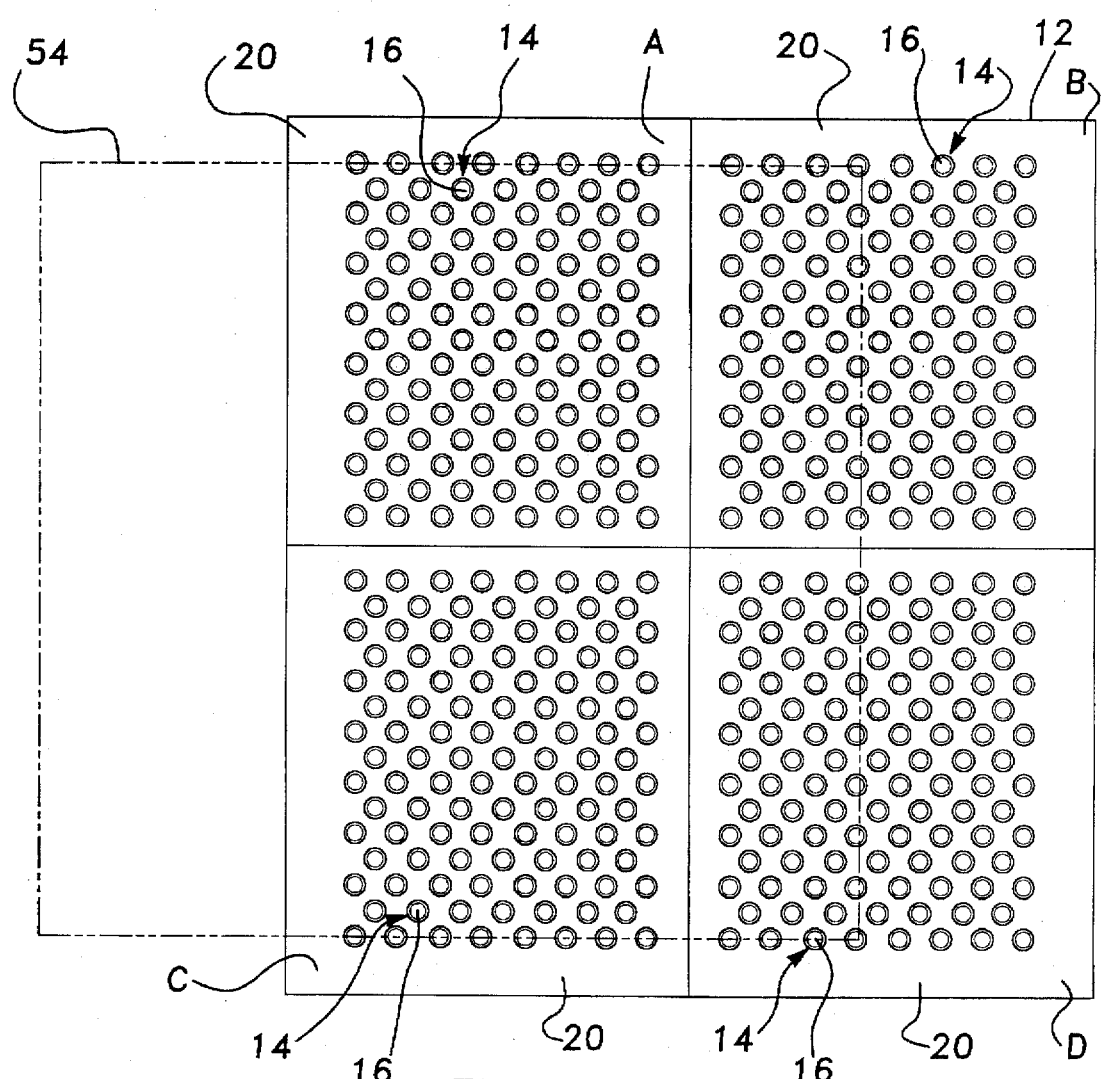
FIG. 2 is a view, along line 2—2 of FIG. 1, of the quadrant detector in accordance with the present invention.

As shown in FIG. 2, each of the apertures 14 and the fiber optic strands 16 are preferably uniform in diameter and equally distributed among quadrants A, B, C, and D of the quadrant detector 12. Therefore, the amount of light exiting the quadrant detector 12 through the first ends 18 of the fiber optic strands 16 is the same for each of the quadrants A, B, C, and D. Consequently, each of the quadrants A, B, C, and D has the same physical surface area of the photosensitive surface 20 allotted thereto. It will be apparent that the quadrant detector 12 may be replaced with other types of suitable light sensing detectors such as a split detector which distributes a photosensitive surface in half. Alternatively, a single surface detector or a reverse-biased semiconductor diode configuration may be employed.

It will be appreciated that the number, pattern and size of the apertures 14 and the fiber optic strands 16 may be varied as desired without departing from the scope of the present invention. In accordance with the preferred embodiment, the apertures 14 have a diameter of approximately 0.01 inches (0.25 mM) and each of the quadrants A, B, C, and D is provided with 113 apertures 14 and 113 corresponding fiber optic strands 16. In this embodiment, the photosensitive surface 21 of the quadrant detector 12 is 0.320 inches by 0.320 inches square.

Returning to FIG. 1, the collimating optical element 28 is disposed between the light source 26 and the light receiving surface 24 of the fiber optic strands 16 such that the light from the light source 26 is collimated by the collimating optical element 28. Therefore, the light striking the light receiving surface 24 is equally distributed across the second ends 22 of the plurality of fiber optic strands 16. Consequently, the amount of light exiting each of the first ends 18 of the fiber optic strands 16 is the same. As a result, the amount of light impinging on the workpiece 50 from each of the quadrants A, B, C, and D is the same. The use of the fiber optic strands 16 within the apertures 14 increases the efficiency of the light collected from the collimating optical element 28 due to the total internal reflection inherent within the fiber optic strands 16. As a result of the improved light transmission efficiency of the light transmitted through the detector 12, the power requirements of the light source 26 is greatly reduced, by up to fifty percent, when compared to past light sensing detector arrangements. Moreover, the need for various standard optical components, such as beamsplitters and complex arrangements of lenses, is eliminated.

Preferably, the collimating optical element 28 has a diameter of approximately 0.490 inches, has an effective focal length of approximately 1.97 inches, and is disposed about 1.97 inches from/the light source 26. Because the collimating optical element 28 provides collimated light, it can be disposed at an arbitrary distance from the light receiving surface 24 of the fiber optic strands As illustrated in FIG. 1, the light sensing detector assembly 10 includes a light shield 52 that encases the light source 26, the collimating optical element 28, and the quadrant detector 12. The light shield 52 is provided to prevent stray light from entering the light receiving surface 24 and thus causing unbalanced light among the quadrants A, B, C, and D. In the preferred embodiment, the light shield 52 is formed from sheet metal or a like material and is disposed in a light tight manner about the quadrant detector 12, the light source 26, and the collimating optical element The light sensing detector assembly 10 further includes means such as a detector array 42 for receiving signals from each of the quadrants A, B, C, and D of the quadrant detector 12, means such as a computer 44 coupled to the detector array 42 for processing the received signals, and a display 46 for displaying the processed signals. The quadrant detector 12 further includes means such as conductive leads 48 associated with each of the quadrants A, B, C, and D for conducting electrical signals from the quadrant detector 12 to the detector array Typically, the detector array 42 includes current-to-voltage amplifiers for converting and amplifying the photocurrents generated by the photosensitive surface of the quadrant detector In one embodiment, the computer 44 is a preprogrammed personal computer that receives the electrical signals outputted from the detector array 42. By way of example, for autocollimation, the computer 44 first generates a sum of the signals from the quadrants A, B, C, and D as follows: A+D; B+C; A+B; and D+C. Thereafter, the x-coordinate is calculated by the difference determination (A+D)×(B+C). Similarly, the y-coordinate signal is calculated by the difference determination (A+B)×(D+C). Then, in the preferred embodiment, to make these coordinate signals independent of the tendency of the reflected light, each coordinate signal is divided by the sum of the four quadrant signals (A+B+C+D). The resultant normalized signals are then inputted to the display 46 for displaying the output from the computer 44. The display 46 provides a visible output representation of the light impinged upon each of the quadrants A, B, C, and D. Typically, the display will be either a video display on a video monitor or a graphical display on a plotter or both.

In operation, as illustrated in FIG. 1, the quadrant detector 12 is disposed in a reference plane and light from the second ends 22 of the fiber optic strands 16 is directed towards the workpiece 50. In accordance with a preferred embodiment, the workpiece 50 is rotatable about an axis and includes a reflective surface 56. As represented in FIG. 2 by dashed line 54, the reflected light is then received by the quadrants A, B, C and D of the photosensitive surface 20. As the workpiece 50 rotates, the amount of reflected light received by each of the quadrants A, B, C and D varies which in turn causes the photocurrents generated by each of the quadrants A, B, C and D to vary accordingly. As such, the signals received by the detector array 42 are processed by the computer 44 to monitor the position and/or the RPM of the workpiece 50. By way of example, the workpiece 50 may be coupled to the crankshaft or camshaft of a vehicle engine in order to monitor angular position and/or RPM. Additionally, the workpiece 50 may be coupled to the wheels of a four wheel drive vehicle to determine the RPM and angular positions of the wheels in order to monitor wheel slippage. Alternatively, the workpiece 50 may be used in aviation applications, such as in conjunction with a helicopter, in order to monitor the RPM and position of the main rotor, or in the case of a compound helicopter, the final position of the stopped blades. It will be apparent to one skilled in the art that the use of the light sensing detector assembly is not restricted to automotive or aviation applications but may be used in conjunction with other application requiring precision measurement or position monitoring.

From the foregoing, it can be seen that compared to previous light sensing detector arrangements, the use of the quadrant detector 12 with the integral fiber optic strands 16 improves the light transmission efficiency from the light source 26 and the collimating optical element 28 to the workpiece 50. Furthermore, compared to previous light sensing detector arrangements, the use of the integral fiber optic strands 16 allows a lower wattage light source 26 to be employed within the assembly 10.

The foregoing discloses and describes merely exemplary embodiments of the present invention. One skilled in the art will readily recognize from such discussion, and from the accompanying drawings and claims, the various changes, modifications, and variations can be made therein without departing from the spirit and scope of the present invention as defined by the following claims.

What is claimed is:

1. A light sensing detector assembly, comprising:
   a light sensing detector having a plurality of apertures extending therethrough, the light sensing detector including:
   (a) a photosensitive surface;
   (b) a plurality of fiber optic strands each having a first end and a second end, each of the plurality of fiber optic strands extending through one of the plurality of apertures with the first ends
   terminating in close proximity to the photosensitive surface; and
   light projecting means for projecting light onto the second ends of the plurality of fiber optic strands such that the light is transmitted through the plurality of fiber optic strands toward a workpiece, whereby light reflected from the workpiece impinges upon the photosensitive surface.

2. The light sensing detector assembly of claim 1, further comprising:
   a layer of transparent optical epoxy disposed on the photosensitive surface and encasing the first ends of the plurality of fiber optic strands.

3. The light sensing detector assembly of claim 1, wherein the light sensing detector is a quadrant detector.

4. The light sensing detector assembly of claim 3, wherein the plurality of apertures and the plurality of fiber optic strands are equally disposed among quadrants of the quadrant detector.

5. The light sensing detector assembly of claim 4, wherein each of the quadrants includes 113 apertures and fiber optic strands.

6. The light sensing detector assembly of claim 1, wherein each of the apertures have a diameter of approximately 0.01 inches.

7. The light sensing detector assembly of claim 1, wherein the light sensing detector is a split detector.

8. The light sensing detector assembly of claim 1, wherein each of the second ends of the plurality of fiber optic strands are randomly mixed and bonded to one another forming a light receiving surface.

9. The light sensing detector assembly of claim 1, further comprising:
   a light shield disposed about the light projecting means and the light sensing detector such that stray light is prevented from entering the second ends of the plurality of fiber optic strands.

10. The light sensing detector assembly of claim 9, wherein the light shield is formed from sheet metal and is disposed in a light tight manner about the light projecting means and the light sensitive detector.

11. The light sensing detector assembly of claim 1, wherein the light projecting means includes a light source and a collimating optical element, the collimating optical element being disposed between the light source and the second ends of the plurality of fiber optic strands.

12. The light sensing detector assembly of claim 3, further comprising:
   means for receiving electrical signals from the quadrant detector; and
   means, associated with each quadrant of the quadrant detector, for conducting electrical signals from the quadrant detector to the means for receiving electrical signals from the quadrant detector.

13. The light sensing detector assembly of claim 12, wherein the means for receiving electrical signals from the quadrant detector includes a plurality of current-to-voltage amplifiers, each of the current-to-voltage amplifiers being disposed to receive electrical signals from only one of the quadrants of the quadrant detector.

14. The light sensing detector assembly of claim 12, further comprising:
   processing means for processing signals from the signal receiving means, said processing means producing an output signal; and
   display means for displaying the output signal from the processing means.

15. The light sensing detector assembly of claim 14, wherein the display means includes a video display.

16. A quadrant detector assembly, comprising:
   a quadrant detector having a plurality of apertures extending therethrough, the quadrant detector including:
   (a) a photosensitive surface;
   (b) a plurality of fiber optic strands each having a first end and a second end, each of the plurality of fiber optic strands extending through one of the plurality of apertures with the first ends
   terminating in close proximity to the photosensitive surface;
   (c) a layer of transparent optical epoxy disposed on the photosensitive surface and encasing the first ends of the plurality of fiber optic strands;
   a light source; and
   a collimating optical element disposed between the light source and the second ends of the plurality of fiber optic strands for projecting light onto the second ends of the plurality of fiber optic strands such that the light is transmitted through the plurality of fiber optic strands toward a workpiece, whereby light reflected from the workpiece impinges upon the photosensitive surface.

17. The quadrant detector assembly of claim 16, wherein each of the second ends of the plurality of fiber optic strands are randomly mixed and bonded to one another forming a light receiving surface.

18. The quadrant detector assembly of claim 16, further comprising:
   a light shield disposed about the light projecting means and the quadrant detector such that stray light is prevented from entering the second ends of the plurality of fiber optic strands.

19. The quadrant detector assembly of claim 16, wherein the light projecting means includes a light source and a collimating optical element, the collimating optical element being disposed between the light source and the second ends of the plurality of fiber optic strands.

20. The quadrant detector assembly of claim 16, further comprising:
   means for receiving electrical signals from the quadrant detector;
   means, associated with each quadrant of the quadrant detector, for conducting electrical signals from the quadrant detector to the means for receiving electrical signals from the quadrant detector; and
   processing means for processing signals from the signal receiving means, said processing means producing an output signal.

* * * * *